(12) United States Patent
Kuroda et al.

(10) Patent No.: US 7,529,163 B2
(45) Date of Patent: May 5, 2009

(54) INFORMATION RECORDING APPARATUS AND METHOD, AND COMPUTER PROGRAM

(75) Inventors: Kazuo Kuroda, Saitama (JP); Eiji Muramatsu, Saitama (JP); Kunihiko Horikawa, Saitama (JP); Atsushi Yamaguchi, Saitama (JP); Masahiro Kato, Saitama (JP); Toshio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 327 days.

(21) Appl. No.: 10/586,647

(22) PCT Filed: Jan. 18, 2005

(86) PCT No.: PCT/JP2005/000530

§ 371 (c)(1),
(2), (4) Date: Jul. 19, 2006

(87) PCT Pub. No.: WO2005/069283

PCT Pub. Date: Jul. 28, 2005

(65) Prior Publication Data

US 2008/0225659 A1  Sep. 18, 2008

(30) Foreign Application Priority Data

Jan. 20, 2004  (JP) .............................. 2004-012335

(51) Int. Cl.
*G11B 7/00* (2006.01)
(52) U.S. Cl. ................................. 369/47.22; 369/53.24
(58) Field of Classification Search .............. 369/275.3, 369/47.22, 53.24, 59.25
See application file for complete search history.

(56) References Cited

U.S. PATENT DOCUMENTS

| | | | |
|---|---|---|---|
| 5,930,225 A * | 7/1999 | Ishida et al. ............. | 369/275.1 |
| 6,656,560 B2 * | 12/2003 | Yamamoto et al. ......... | 428/64.4 |
| 6,757,230 B2 * | 6/2004 | Noda et al. .............. | 369/47.54 |
| 6,801,494 B2 * | 10/2004 | Ross ....................... | 369/275.3 |
| 2002/0027847 A1 * | 3/2002 | Noda et al. .............. | 369/47.47 |
| 2004/0151098 A1 * | 8/2004 | Nagano et al. ........... | 369/53.21 |

FOREIGN PATENT DOCUMENTS

| | | |
|---|---|---|
| JP | 2000-311346 A | 11/2000 |
| JP | 2001-023237 A | 1/2001 |
| JP | 2002-150607 A | 5/2002 |

(Continued)

*Primary Examiner*—Wayne R Young
*Assistant Examiner*—Van N Chow
(74) *Attorney, Agent, or Firm*—Young & Thompson

(57) ABSTRACT

A disc-shaped information recording medium has a first and a second recording layer. A buffer area is arranged adjacent to a recording area of each of the layers for preventing deviation of the recording position onto/from each of the layers. A first part of the information is written along a first track path on the first recording layer, a predetermined amount of first buffer data in a part of the buffer area of the first recording layer is written into the first recording layer, and inter-layer jump is performed from the first recording layer to the second recording layer. A predetermined amount of second buffer data in the buffer area of the second recording layer is written in the second recording layer and write element is controlled to write a second part of the information to be recorded, on the second recording layer by changing the recording direction.

16 Claims, 10 Drawing Sheets

FOREIGN PATENT DOCUMENTS

| | | |
|---|---|---|
| JP | 2003-288759 A | 10/2003 |
| JP | 2004-295950 A | 10/2004 |
| JP | 2004-362726 A | 12/2004 |
| JP | 2005-063589 A | 3/2005 |
| JP | 2005-093032 A | 4/2005 |

* cited by examiner

[FIG. 1]
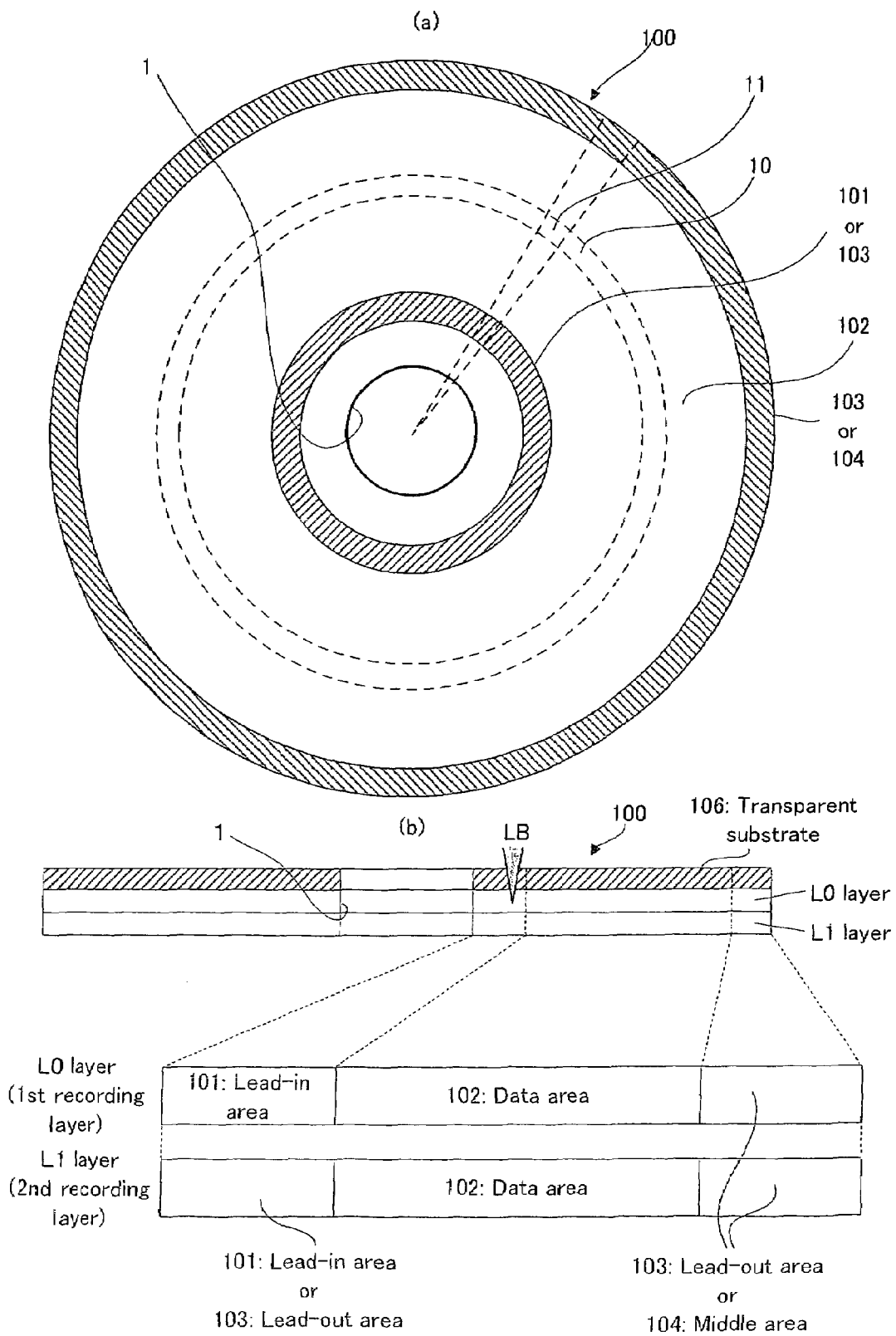

[FIG. 2]
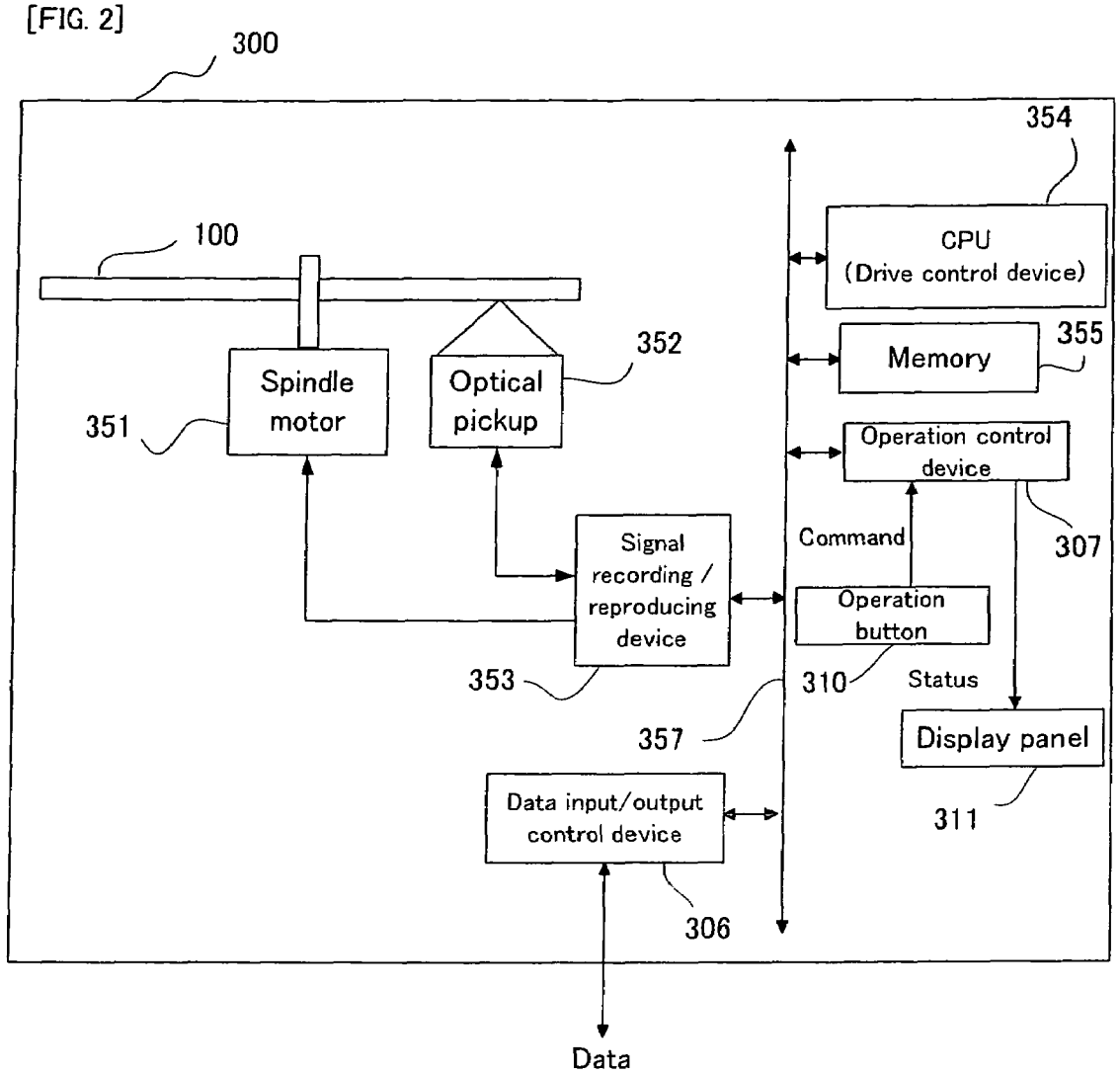

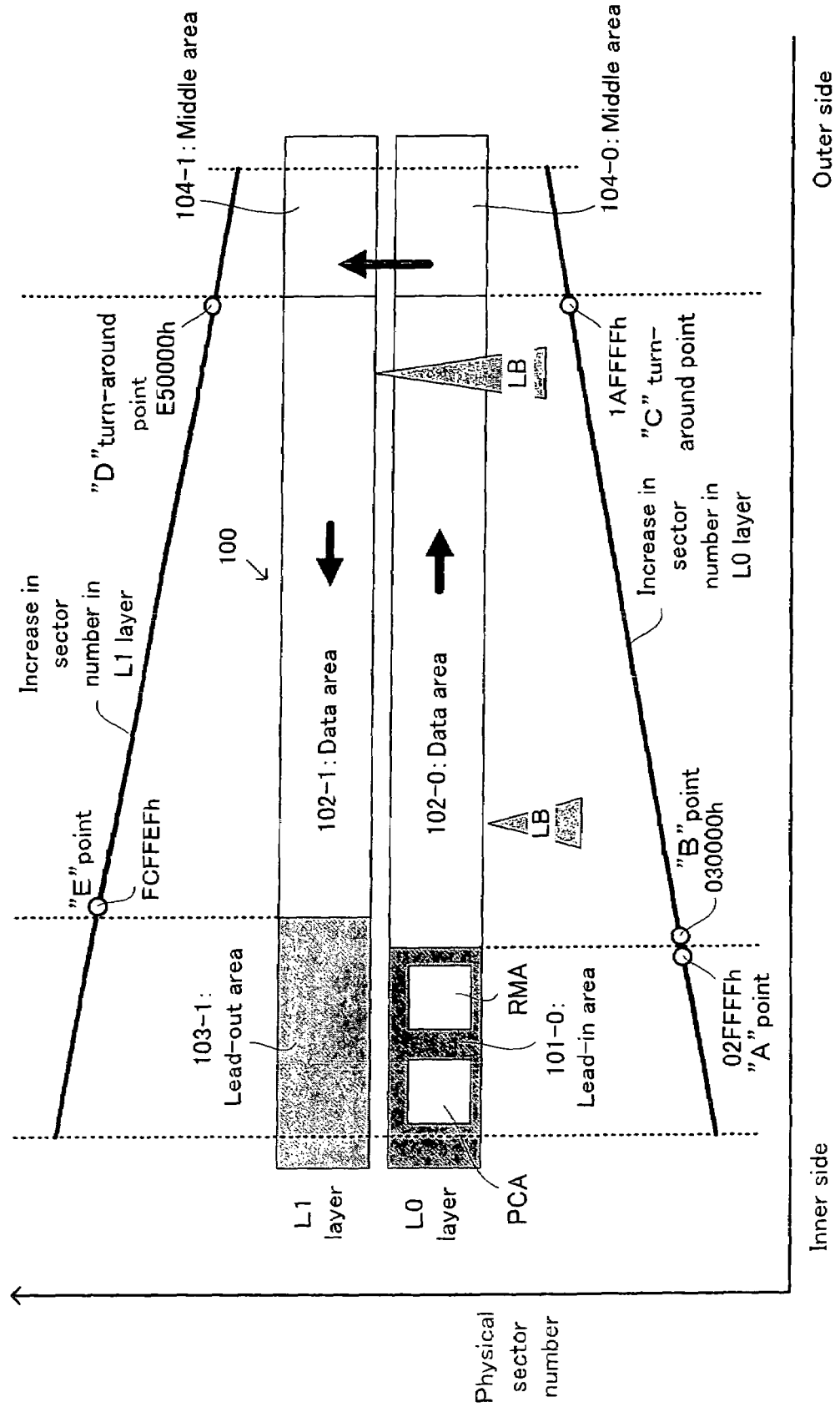
[FIG. 3]

[FIG. 4]
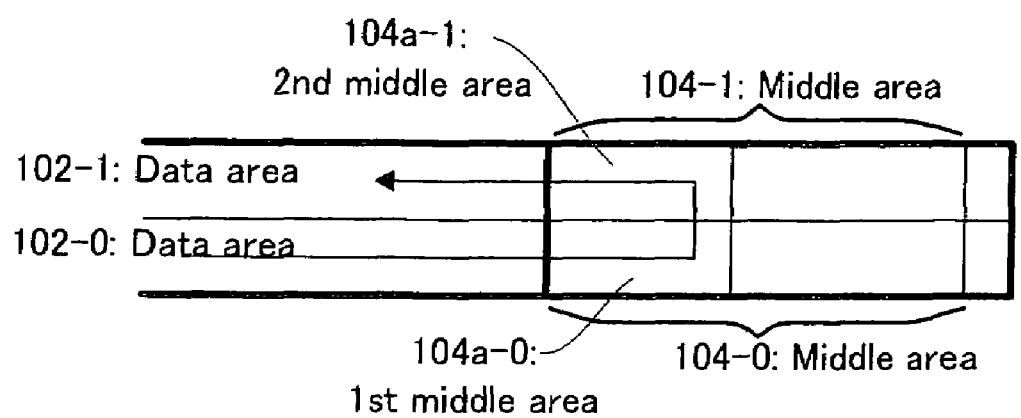

[FIG. 5]
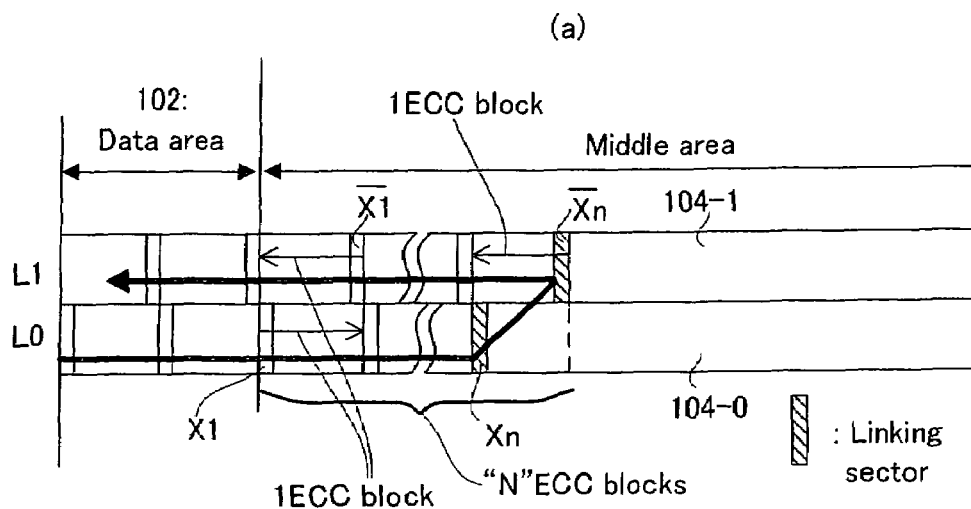
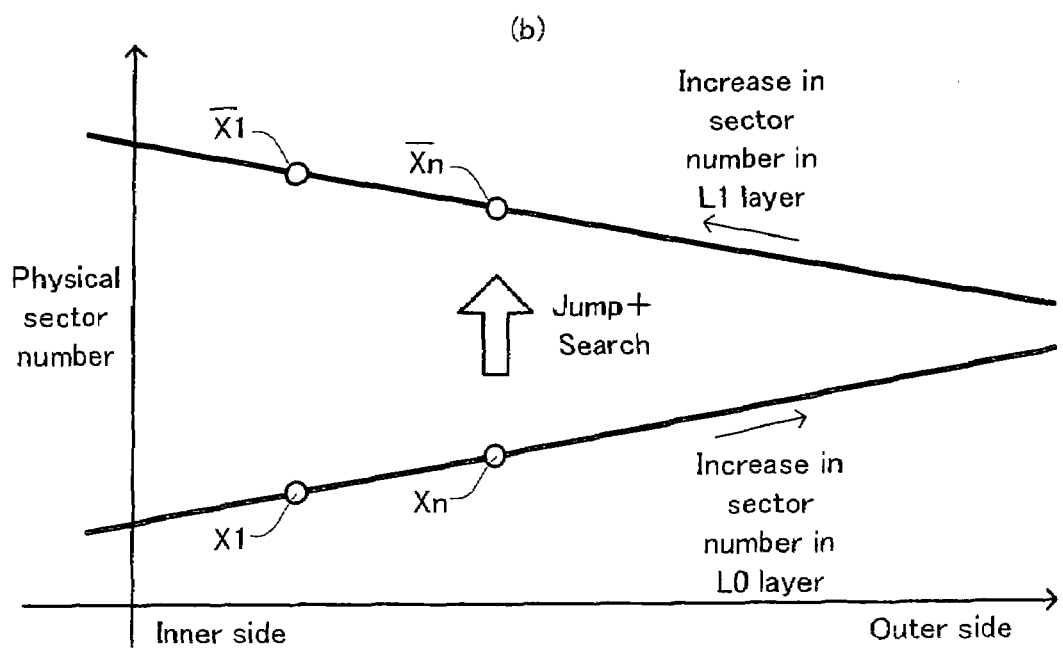

[FIG. 6]
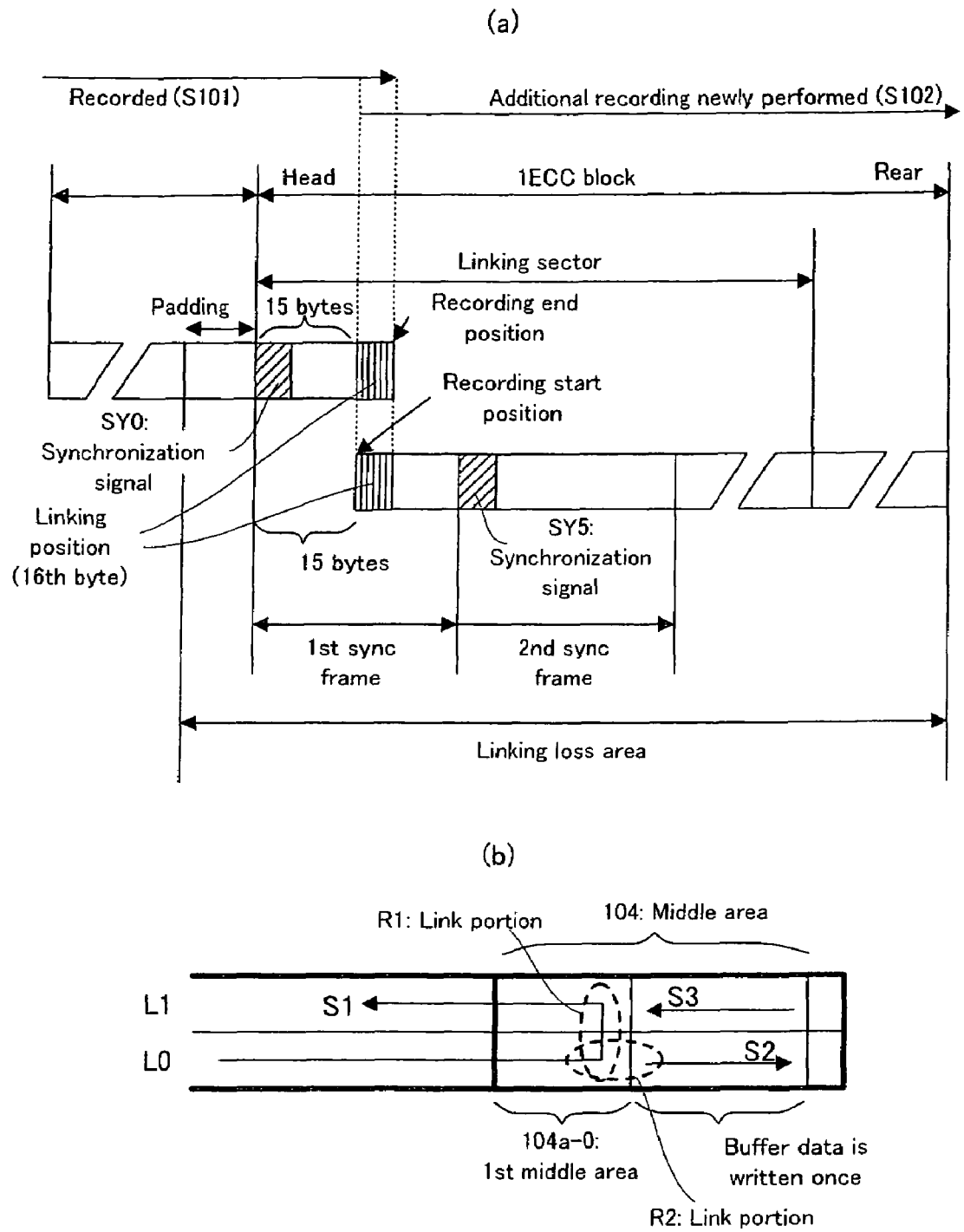

[FIG. 7]
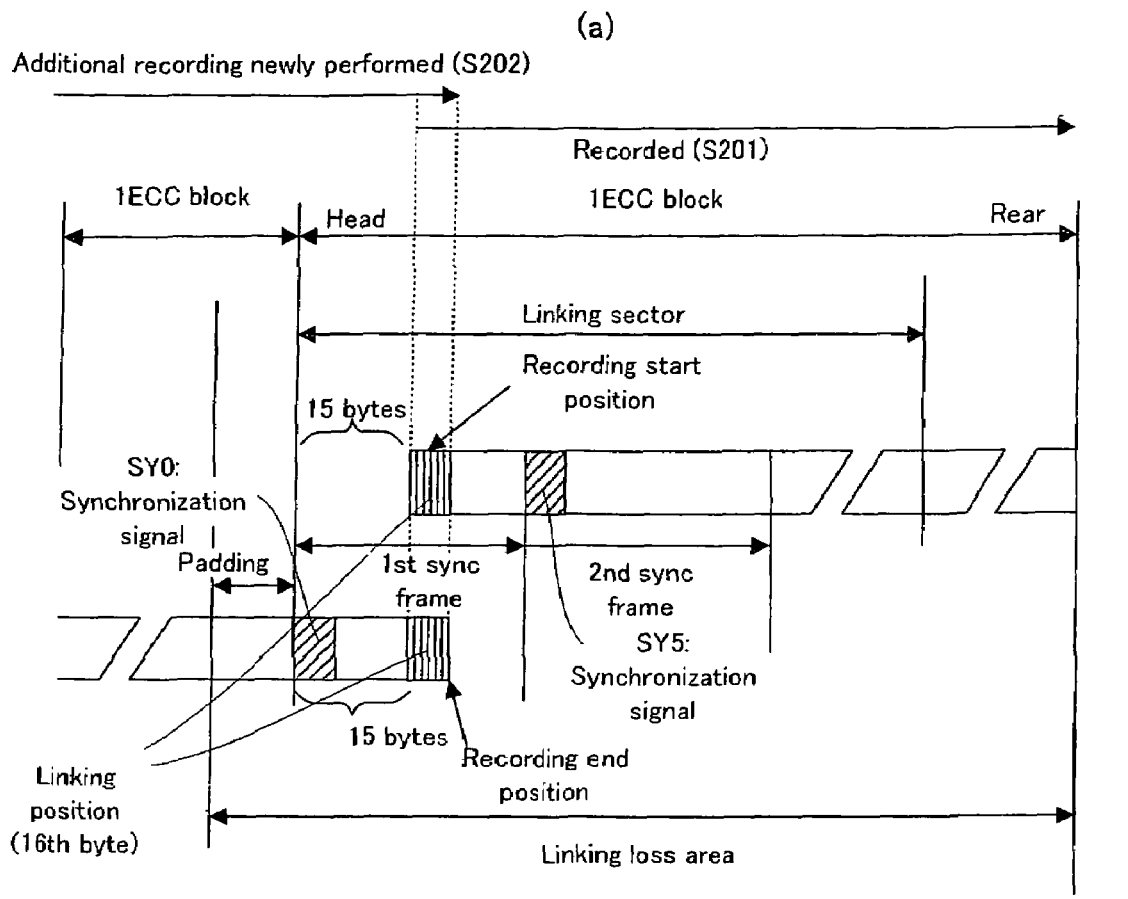
(a)
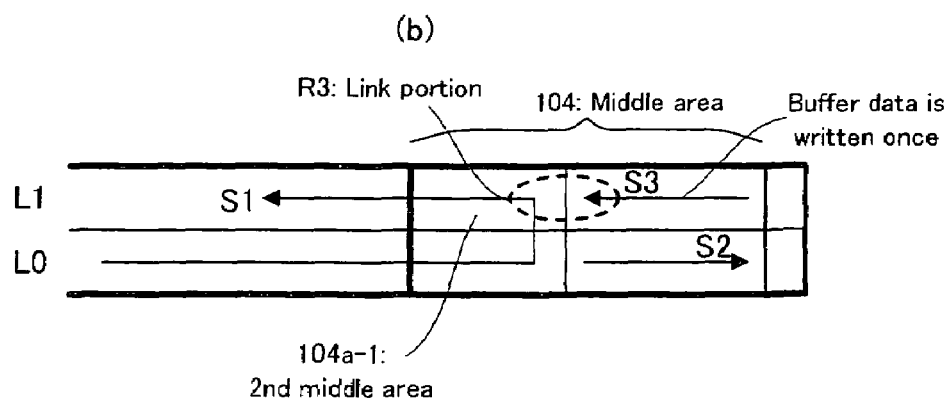
(b)

[FIG. 8]
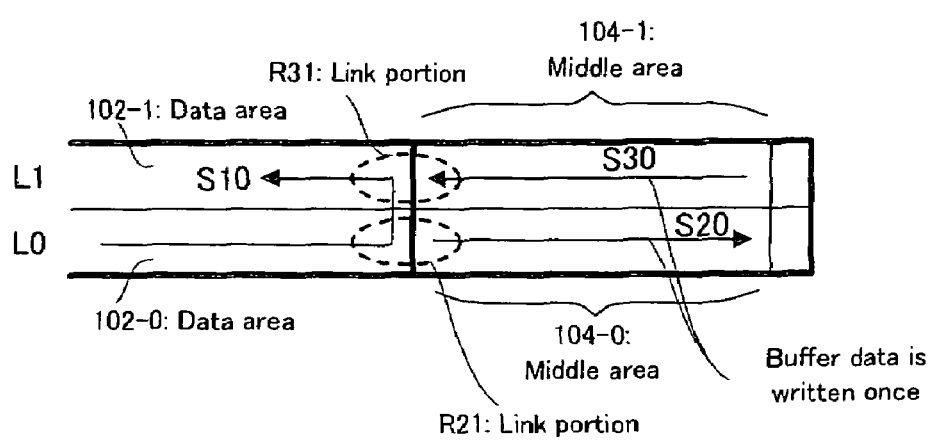
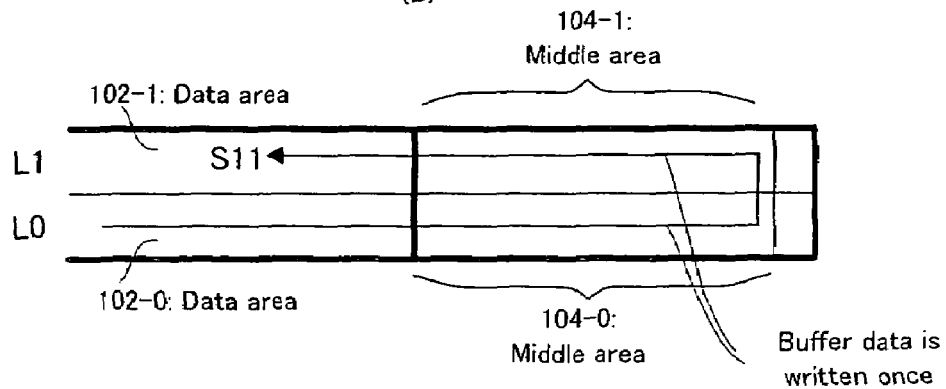

[FIG. 9]
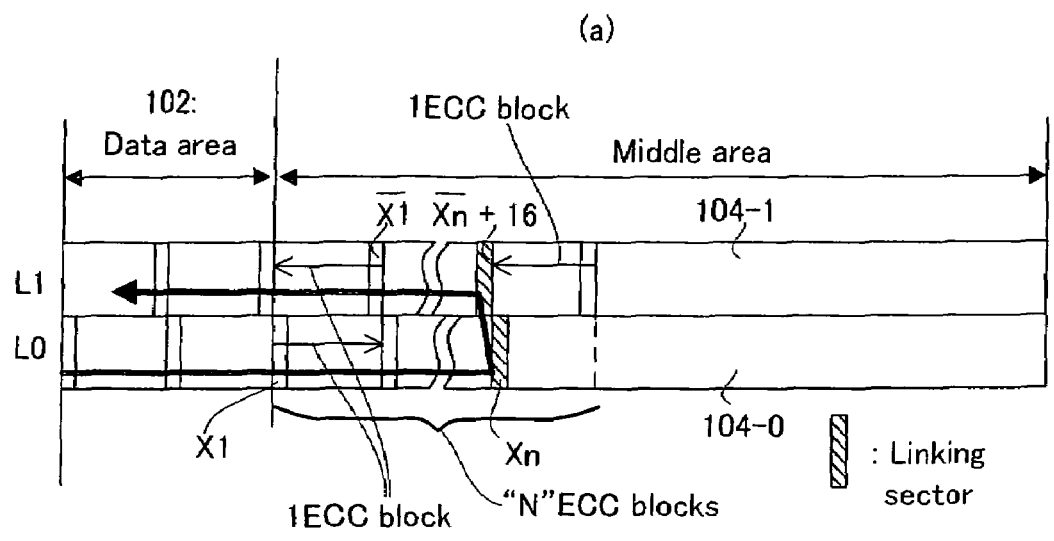
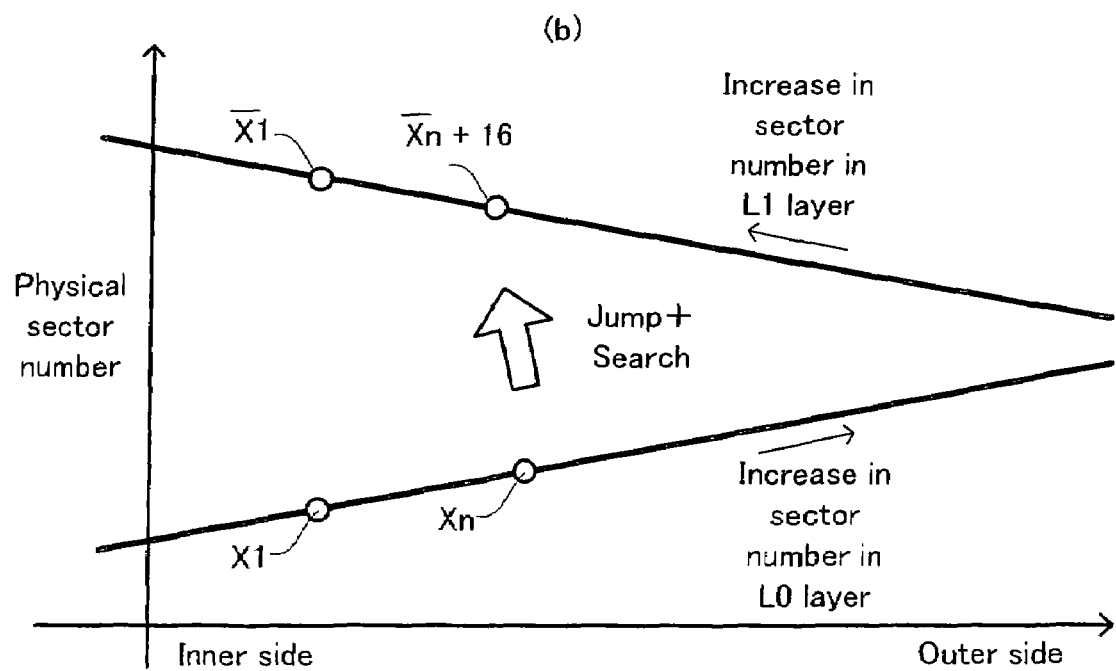

[FIG. 10]
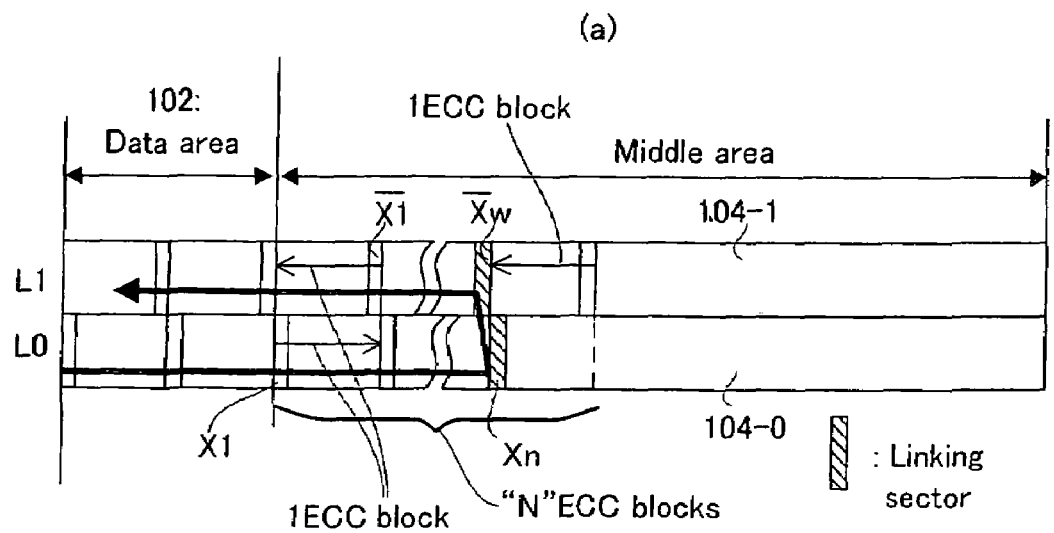
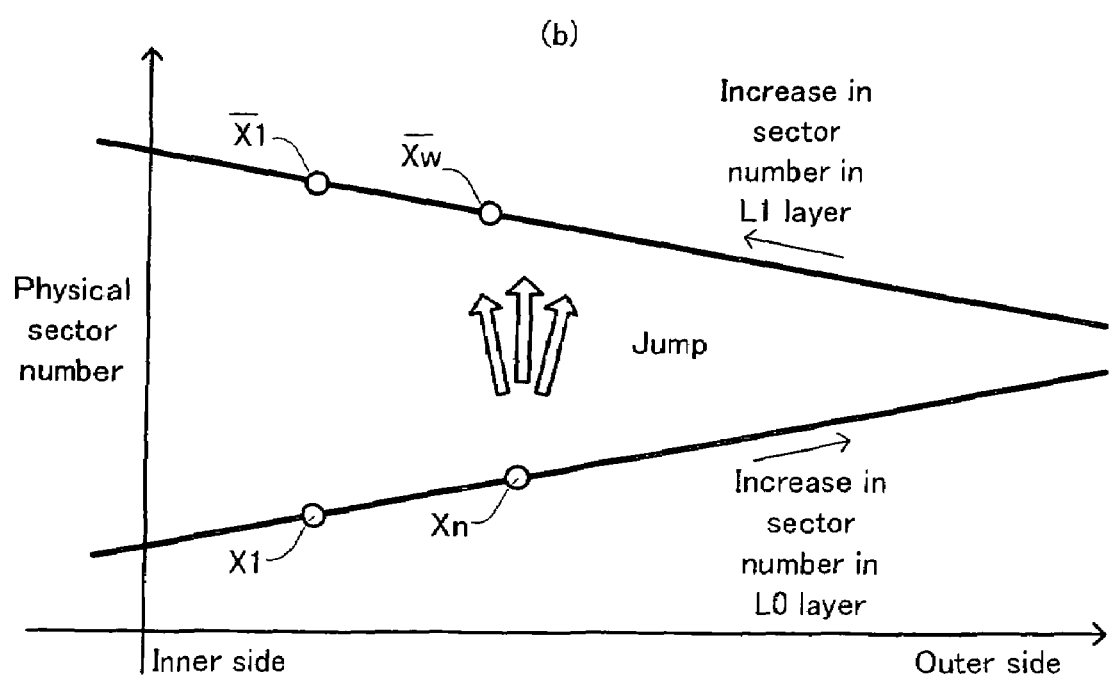

US 7,529,163 B2

INFORMATION RECORDING APPARATUS AND METHOD, AND COMPUTER PROGRAM

TECHNICAL FIELD

The present invention relates to an information recording apparatus, such as a DVD recorder, an information recording method, and a computer program.

BACKGROUND ART

In an information recording medium, such as a CD and a DVD, for example, as described in patent documents 1 and 2 or the like, there is also developed an information recording medium, such as an optical disc of a multilayer type or dual layer type or multiple layer type, in which a plurality of recording layers are laminated or stacked on the same substrate. Then, on an information recording apparatus, such as a CD recorder, for performing the recording with respect to the dual layer type, i.e., two-layer type optical disc, laser light for recording is focused or condensed on a recording layer located on the front as viewed from the irradiation side of the laser light (hereinafter referred to as an "L0 layer", as occasion demands), to thereby record information into the L0 layer in an irreversible change recording method by heat or in a rewritable method. Moreover, the laser light is focused or condensed on a recording layer located on the rear of the L0 layer as viewed from the irradiation side of the laser light (hereinafter referred to as an "L1 layer", as occasion demands), through the L0 layer or the like, to thereby record information into the L1 layer in the irreversible change recording method by heat or the rewritable method.

On the other hand, there is also disclosed a technology of performing the recording or reproduction in an "opposite method" or the like with respect to the L0 layer and the L1 layer. The "opposite method" herein is a recording or reproduction method in which the directions of track paths are opposite between the two recording layers, for example.

In the link (linking) of such a write-once type optical disc, such as a DVD-R, three types of linking sizes are defined, which are 32 KB, 2 KB, and lossless linking. In the case where the linking size is 32 KB, if the recording is completed by a unit of 1ECC block, for example, information for the link is recorded within a second sync frame of a sector at the head of the ECC block, before a 32 KB linking loss area is provided. Then, padding is performed until the 32 KB linking loss area is filled up, and the additional or postscript recording of user data is started from a NWA (Next Writable Address). As described above, in the case where the linking size is 32 KB, overhead increases more, however, error correction by the unit of ECC block is not influenced by the link, resulting in high-quality.

On the other hand, in the case where the linking size is 2 KB in which padding is performed until a 2 KB linking loss area is filled up, there is such a characteristic that overhead can be less, but a capability of error correction by the unit of ECC block is reduced. In addition, in the case of the lossless linking, which is to compensate for the lack of data in the linking loss area with the error correction capability, the error correction capability is reduced as in the 2 KB linking.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

However, in the recording operation of the two-layer type optical disc, if layer jump (layer change) is performed not in buffer areas but in data areas of the L0 layer and the L1 layer in which actual data, such as contents, is written, a relatively long time is required in search by laser light from an optical pickup, in order to access a desired position because there is a bonding shift error or the like. Alternatively, there is such a technical problem that when buffer data is written into the buffer areas of the L0 layer and the L1 layer at the time of a finalize process, for example, the link is directly generated for the actual data recorded in the data areas of the L0 layer and the L1 layer, and this causes deterioration of signal quality of the linked actual data.

In order to solve the above-mentioned problem, it is therefore an object of the present invention to provide an information recording apparatus, an information recording method, an information recording/reproducing apparatus, and an information recording/reproducing method, which allow information to be efficiently recorded and a recording time to be reduced, in each recording layer of a multilayer type information recording medium, for example, and a computer program which makes a computer as the information recording apparatus.

Means for Solving the Subject

In order to solve the above object of the present invention, an information recording apparatus of the present invention is provided with: a writing device (i) capable of writing, with respect to a disc-shaped information recording medium in which at least first and second recording layers making a pair are laminated and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and (ii) capable of writing a second portion out of the information to be recorded into the second recording layer, with a recording direction reversed, along a second track path directing from the other side to the one side; and a controlling device for controlling the writing device (I) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then (II) to write a predetermined amount of second buffer data into the second recording layer along the second track path in one portion of the buffer area of the second recording layer, and then write the second portion into the second recording layer along the second track path.

In order to solve the above object of the present invention, an information recording/reproducing apparatus is further provided with: a reading device capable of reading the first and second portions from the first and second recording layers; and a reproducing device for reproducing the read first and second portions, the controlling device controlling the reading device (I) to read the first portion from the first recording layer along the first track path, and then read the predetermined amount of first buffer data in the one portion of the buffer area of the first recording layer, and then (II) to search for any one of addresses out of the correspondence address, the quasi-correspondence address, and the firstly recognized address, while reading the predetermined amount of second buffer data in the one portion of the buffer area of the second recording layer, and then start reading of the second portion along the second track path on the basis of the searched address, and controls the reproducing device to reproduce the read first and second portions.

In order to solve the above object of the present invention, an information recording method of the present invention is an information recording method in an information recording apparatus provided with: a writing device (i) capable of writing, with respect to a disc-shaped information recording medium in which at least first and second recording layers making a pair are laminated and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and (ii) capable of writing a second portion out of the information to be recorded into the second recording layer, with a recording direction reversed, along a second track path directing from the other side to the one side, the information recording method provided with: a controlling process of controlling the writing device (I) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then (II) to write a predetermined amount of second buffer data into the second recording layer along the second track path in one portion of the buffer area of the second recording layer, and then write the second portion into the second recording layer along the second track path.

In order to solve the above object of the present invention, an information recording/reproducing method of the present invention is an information recording/reproducing method in an information recording/reproducing apparatus, provided with: the information recording apparatus according to claim 3, and further provided with: reading device capable of reading the first and second portions from the first and second recording layers; and a reproducing device for reproducing the read first and second portions: a reading device capable of reading the first and second portions from the first and second recording layers; and a reproducing device for reproducing the read first and second portions, the information recording/reproducing method provided with: a controlling process of controlling the reading device (I) to read the first portion from the first recording layer along the first track path, and then read the predetermined amount of first buffer data in the one portion of the buffer area of the first recording layer, and then (II) to search for any one of addresses out of the correspondence address, the quasi-correspondence address, and the firstly recognized address, while reading the predetermined amount of second buffer data in the one portion of the buffer area of the second recording layer, and then start reading of the second portion along the second track path on the basis of the searched address.

In order to solve the above object of the present invention, a computer program of the present invention is a computer program of instructions for recording control and for tangibly embodying a program of instructions executable by a computer provided in the information recording apparatus according to claim 1, to make the computer function as at least one portion of the controlling device and the writing device.

BRIEF DESCRIPTION OF DRAWINGS

FIG. 1 are a substantial plan view showing the basic structure of an optical disc having a plurality of recording areas and associated with an information recording medium which is a recording target of a first example of the information recording apparatus of the present invention (FIG. 1(a)), and a schematic cross sectional view of the optical disc and a corresponding conceptual diagram showing a recording area structure in the radial direction (FIG. 1(b)).

FIG. 2 is a block diagram showing an information recording/reproducing apparatus in the first example of the information recording apparatus of the present invention.

FIG. 3 is a conceptual graph showing the data structure of a two-layer type optical disc associated with the information recording medium which is a recording target of the first example of the information recording apparatus of the present invention, a physical sector number of a sector constituting an ECC block in the recording areas of the optical disc, and a recording or reproducing method by an opposite method of the optical disc.

FIG. 4 is a schematic conceptual view showing an outline of the operation of the information recording/reproducing apparatus in the first example of the information recording apparatus of the present invention.

FIG. 5 are a schematic conceptual view showing the principle of an operation in which buffer data is written into a middle area of the optical disc and layer jump is performed by the information recording/reproducing apparatus in the first example of the information recording apparatus of the present invention (FIG. 5(a)), and a schematic graph showing transition of the sector number upon the layer jump (FIG. 5(b)).

FIG. 6 are a schematic structure diagram showing one specific example of the structure of a link along a track path in a linking position in a sector by the information recording/reproducing apparatus in the first example of the information recording apparatus of the present invention (FIG. 6(a)), and a schematic conceptual view showing a position where the link is performed (FIG. 6(b)).

FIG. 7 are a schematic structure diagram showing one specific example of the structure of a link in a direction opposite to the track path in the linking position in the sector by the information recording/reproducing apparatus in the first example of the information recording apparatus of the present invention (FIG. 7(a)), and a schematic conceptual view showing a position where the link is performed (FIG. 7(b)).

FIG. 8 are a schematic conceptual view showing an outline of the operation of an information recording/reproducing apparatus in one specific example of a comparison example (FIG. 8(a)), and a schematic conceptual view showing an outline of the operation of an information recording/reproducing apparatus in another specific example of a comparison example (FIG. 8(b)).

FIG. 9 are a schematic conceptual view showing the principle of an operation in which buffer data is written into a middle area of the optical disc and layer jump is performed by an information recording/reproducing apparatus in a second example of the information recording apparatus of the present invention (FIG. 9(a)), and a schematic graph showing transition of the sector number upon the layer jump (FIG. 9(b)).

FIG. 10 are a schematic conceptual view showing the principle of an operation in which buffer data is written into a middle area of the optical disc and layer jump is performed by an information recording/reproducing apparatus in a third example of the information recording apparatus of the present invention (FIG. 10(*a*)), and a schematic graph showing transition of the sector number upon the layer jump (FIG. 10(*b*)).

DESCRIPTION OF REFERENCE CODES

1 . . . center hole, 10 . . . track, 11 . . . ECC block, 100 . . . optical disc, 101 . . . lead-in area, 102-0 (102-1) . . . data area, 103 . . . lead-out area, 104-0 (104-1) . . . middle area, 104*a*-0 . . . first middle area, 104*a*-1 . . . second middle area, 106 . . . transparent substrate, 300 . . . information recording/reproducing apparatus, 306 . . . data input/output control device, 307 . . . operation control device, 310 . . . operation button, 311 . . . display panel, 351 . . . spindle motor, 352 . . . optical pickup, 353 . . . signal recording/reproducing device, 354 . . . CPU (drive control device), 355 . . . memory, LB . . . laser light, R1, R2, R3, R21, and R31 . . . link portion, SY0 and SY5 . . . synchronization signal

BEST MODE FOR CARRYING OUT THE INVENTION

Embodiment of Information Recording Apparatus

Hereinafter, the information recording apparatus in an embodiment of the present invention will be explained.

An embodiment of the information recording apparatus of the present invention is provided with: a writing device (i) capable of writing, with respect to a disc-shaped information recording medium in which at least first and second recording layers making a pair are laminated and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and (ii) capable of writing a second portion out of the information to be recorded into the second recording layer, with a recording direction reversed, along a second track path directing from the other side to the one side; and a controlling device for controlling the writing device (I) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then (II) to write a predetermined amount of second buffer data into the second recording layer along the second track path in one portion of the buffer area of the second recording layer, and then write the second portion into the second recording layer along the second track path.

According to the embodiment of the information recording apparatus of the present invention, in the disc-shaped information recording medium which is a target, at least the first recording layer (e.g. L0 layer) and the second recording layer (e.g. L1 layer) making a pair are laminated, and the disc-shaped information recording medium has the buffer area, such as a middle area, in a predetermined portion in the first and second recording layers, to perform layer jump of a recording or reproduction position from the first recording layer to the second recording layer. The "buffer area" herein is disposed in a position adjacent to a recording area where information, such as data, is recorded, and has a basic function to prevent the recording or reproduction position for the first and second recording layers from being off to an unrecorded area. It also has a function as a so-called "jump buffer area", to prevent the recording or reproduction position from being off to the unrecorded area upon the layer jump. Moreover, the expression "making a pair" in the present invention means that address information in the first and second recording layers maintains some physical or logical association, such as a complement number relationship.

By virtue of such construction, upon the recording onto the information recording medium, the first portion out of the information to be recorded is recorded into the first recording layer along the first track path directing from one side to the other side out of the inner circumferential side and the outer circumferential side of the disc-shaped information recording medium, by the writing device, such as an optical pickup, under the control of the controlling device, such as CPU. Then, the layer jump is performed in the buffer area. Then, in the opposite method, for example, the second portion out of the information to be recorded is recorded into the second recording layer, with a recording direction reversed, along the second track path directing from the other side to the one side.

Particularly in the embodiment, under the control of the controlling device, the writing device writes the predetermined amount of first and second buffer data into one portion of the buffer area in the first and second recording layers. More specifically, the first portion, such as contents, is recorded into the first recording layer. Then, continuously, the predetermined amount of first buffer data of the present invention is written into one portion of the buffer area of the first recording layer. The predetermined amount of buffer data herein is dummy data for buffer, which is different from actual data, with a predetermined information amount. Then, after the layer jump from the one portion of the buffer area of the first recording layer to the second layer, the predetermined amount of second buffer data of the present invention is written into one portion of the buffer area of the second recording layer. Then, continuously, the second portion is recorded into the second recording layer.

Therefore, according to the embodiment, a link is not generated for the first and second portions (or between the first portion and the second portion) which are actual data, at the time of a recording operation by the writing device, under the control of the controlling device, and the link is generated for the first and second buffer data written in one portion of the first and second buffer areas or between the first buffer data written in one portion of the first buffer area and the second buffer data written in one portion of the second buffer area. Thus, it is possible to almost or completely prevent the deterioration of signal quality caused by the layer jump between the first portion and second portion which are actual data, at the time of a recording or reproduction operation. In addition, upon the layer jump at the time of the recording operation, the predetermined amount of first and second buffer data is written not into the buffer area as a whole in the first and second recording layers, but into the one portion of the buffer area in the first and second recording layers. Thus, it is possible to greatly reduce a time required for the layer jump as a whole.

If the layer jump is performed not in the buffer area but in the first and second recording layers where the first and second portions which are actual data, such as contents, are written, a link is generated along the first track path, for (in other word, "from or to") the first portion which is actual data, in the first recording layer, when the first and second buffer data is written into the first and second recording layers at the time of a finalize process, for example. This causes the deterioration of signal quality of the linked actual data. On the other hand, even in the second recording layer, in the same manner, a link is generated in a direction opposite to the second track path, for (in other word, "from or to") the second portion which is actual data, and this also causes the deterioration of signal quality of the linked actual data.

In contrast, according to the embodiment, the link is not generated for the first and second portions which are actual data, at the time of the recording operation by the writing device, under the control of the controlling device, and the link is generated for the first and second buffer data respectively written in one portion of the first and second buffer areas. Thus, it is possible to almost or completely prevent the deterioration of signal quality caused by the layer jump of the first and second portions which are actual data, at the time of the recording or reproduction operation.

Alternatively, if the buffer data is written into the buffer area as a whole in the first and second recording layers upon the layer jump, the link is not generated for the first and second portions which are actual data; however, this causes a longer time required for the layer jump as a whole.

In contrast, according to the embodiment, the predetermined amount of first and second buffer data is written not into the buffer area as a whole in the first and second recording layers, but into the buffer area partially. Thus, it is possible to greatly reduce a time required for the layer jump as a whole.

In one aspect of the embodiment of the information recording apparatus of the present invention, the controlling device controls the writing device to end writing of the predetermined amount of first buffer data into the first recording layer, in a predetermined recording unit including a physical address, in the one portion of the buffer area of the first recording layer.

According to this aspect, under the control of the controlling device, the writing device ends the writing of the predetermined amount of first buffer data into the first recording layer, in the predetermined recording unit including the physical address, in the one portion of the buffer area of the first recording layer. The physical address herein is, specifically, a physical sector number. Moreover, the predetermined recording unit is, specifically, an ECC block with an information amount of a predetermined size.

In this aspect, the controlling device may control the writing device to start writing of the predetermined amount of second buffer data into the second recording layer, from a predetermined recording unit including a correspondence address in the one portion of the buffer area of the second recording layer corresponding to the physical address.

By virtue of this construction, under the control of the controlling device, the writing device starts the writing of the predetermined amount of second buffer data into the second recording layer, in the predetermined recording unit including the correspondence address in the one portion of the buffer area of the second recording layer corresponding to the physical address. The correspondence address herein is position information in a complement number relationship with the physical address of the buffer area in the first recording layer. Thus, it is easy to manage the physical address and the correspondence address, even logically.

In this aspect, the controlling device may control the writing device to search for the correspondence address after the writing of the predetermined amount of first buffer data into the first recording layer, and to write the predetermined amount of second buffer data on the basis of the searched correspondence address.

By virtue of this construction, under the control of the controlling device, the writing device searches for the desired correspondence address, which allows the layer jump to be more accurate.

In this aspect, the controlling device may control the writing device to start writing of the predetermined amount of second buffer data into the second recording layer, from a predetermined recording unit including a quasi-correspondence address which is supposed to be located on the one side of a correspondence address in the one portion of the buffer area of the second recording layer corresponding to the physical address.

By virtue of this construction, under the control of the controlling device, the writing device starts the writing from the quasi-correspondence address which is located only by "1" ECC block (16 sectors) on the inner circumferential side of the searched correspondence address. Thus, it is possible to perform a smooth and efficient recording operation along the first and second track paths.

In this aspect, the controlling device may control the writing device to search for the quasi-correspondence address after the writing of the predetermined amount of first buffer data into the first recording layer, and to write the predetermined amount of second buffer data on the basis of the searched quasi-correspondence address.

By virtue of this construction, under the control of the controlling device, the writing device searches for the desired quasi-correspondence address, which allows the layer jump to be faster.

In this aspect, the controlling device may control the writing device to start writing of the predetermined amount of second buffer data into the second recording layer, from a predetermined recording unit including a firstly recognized address.

By virtue of this construction, under the control of the controlling device, the writing device starts the writing of the predetermined amount of second buffer data into the second recording layer, from the predetermined recording unit including the firstly recognized address. Thus, the search operation is not necessary, so that it is possible to perform a faster and more efficient recording operation.

In this aspect, the controlling device may control the writing device to write the firstly recognized address into a predetermined area in at least one of the first and second recording layers.

By virtue of this construction, under the control of the controlling device, the writing device writes the firstly recognized address into the predetermined area, such as a RMA (Recording Management area) or a middle area, for example, in at least one of the first and second recording layers. Thus, by obtaining the firstly recognized address written in the predetermined area beforehand, it is possible to perform a fast, accurate, and efficient recording operation.

In this aspect, the controlling device may control the writing device to write a last address where recording is ended in the one portion of the buffer area of the first recording layer, into a predetermined area in at least one of the first and second recording layers.

By virtue of this construction, under the control of the controlling device, the writing device writes the last address into the predetermined area such as the RMA or the middle area, for example, in at least one of the first and second recording layers. Thus, by obtaining the last address beforehand where the recording is ended in the one portion of the buffer area of the first recording layer, it is possible to perform a fast, accurate, and efficient recording operation.

In another aspect of the embodiment of the information recording apparatus of the present invention, the controlling device controls the writing device to further write the first buffer data in order to fill up another portion of the first buffer area and to further write the second buffer data in order to fill up another portion of the second buffer area, after writing of the second portion into the second recording layer is completed.

According to this aspect, under the control of the controlling device, the writing device further writes the first buffer data in order to fill up another portion of the first buffer area and further writes the second buffer data in order to fill up another portion of the second buffer area, after the writing of the second portion into the second recording layer is completed, at the time of the finalize process, for example. Thus, it is possible to maintain compatibility with a DVD-ROM.

In another aspect of the embodiment of the information recording apparatus of the present invention, the controlling device controls the writing device to start recording of the first portion from a portion of the first recording layer continued from a lead-in area of the information recording medium, and to write information for forming a lead-out area on the one side of a recording end position of the second recording layer, after writing of the second portion into the second recording layer is completed.

According to this aspect, under the control of the controlling device, the writing device starts the recording of the first portion from the portion of the first recording layer continued from the lead-in area of the information recording medium, and writes the information for forming the lead-out area on the one side of the recording end position of the second recording layer, after the writing of the second portion into the second recording layer is completed, at the time of the finalize process, for example. Thus, it is possible to maintain compatibility with a DVD-ROM.

In another aspect of the embodiment of the information recording apparatus of the present invention, the writing device can optically write the first and second portions by irradiating laser light, the second recording layer is located on a rear side of the first recording layer as viewed from an irradiation direction of the laser light, and the controlling device controls the writing device to perform layer focus jump from the first recording layer to the second recording layer, as the layer jump.

According to this aspect, in the recording operation in which the opposite method is adopted for a write-once type optical disc of a dual layer type, it is possible to improve swiftness and reliability of the layer focus jump, i.e: an operation for adjusting a focus between the two layers, performed by the writing device.

Embodiment of Information Recording/Reproducing Apparatus

Hereinafter, the information recording/reproducing apparatus in an embodiment of the present invention will be discussed.

The embodiment of the information recording/reproducing apparatus of the present invention is further provided with: a reading device capable of reading the first and second portions from the first and second recording layers; and a reproducing device for reproducing the read first and second portions, the controlling device controlling the reading device (I) to read the first portion from the first recording layer along the first track path, and then read the predetermined amount of first buffer data in the one portion of the buffer area of the first recording layer, and then (II) to search for any one of addresses out of the correspondence address, the quasi-correspondence address, and the firstly recognized address, while reading the predetermined amount of second buffer data in the one portion of the buffer area of the second recording layer, and then start reading of the second portion along the second track path on the basis of the searched address, and controls the reproducing device to reproduce the read first and second portions.

According to the embodiment of the information recording/reproducing apparatus of the present invention, a link is not generated for the first and second portions which are actual data, but is generated for the first and second buffer data respectively written in the one portion of the first and second buffer areas. Thus, it is possible to almost or completely prevent the deterioration of signal quality caused by the layer jump of the first and second portions which are actual data, at the time of the reproduction operation by the reproducing device, under the control of the controlling device. In addition, upon the layer jump, it is possible to perform a fast, accurate, and efficient reproduction operation.

Embodiment of Information Recording Method

Hereinafter, the information recording method in an embodiment of the present invention will be discussed.

The embodiment of the information recording method of the present invention is an information recording method in an information recording apparatus provided with: a writing device (i) capable of writing, with respect to a disc-shaped information recording medium in which at least first and second recording layers making a pair are laminated and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and (ii) capable of writing a second portion out of the information to be recorded into the second recording layer, with a recording direction reversed, along a second track path directing from the other side to the one side, the information recording method provided with: a controlling process of controlling the writing device (I) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then (II) to write a predetermined amount of second buffer data into the second recording layer along the second track path in one portion of the buffer area of the second recording layer, and then write the second portion into the second recording layer along the second track path.

According to the embodiment of the information recording method of the present invention, as in the case of the above-mentioned embodiment of the information recording apparatus of the present invention, a link is not generated for the first and second portions, which are actual data, at the time of the recording operation by the writing device, under the control of the controlling device, and a link is generated for the first and second buffer data written in one portion of the first and second buffer areas. Thus, it is possible to almost or completely prevent the deterioration of signal quality caused by the layer jump of the first and second portions which are actual data, at the time of the recording or reproduction operation. In addition, upon the layer jump at the time of the recording operation, the predetermined amount of first and second buffer data is written not into the buffer area as a whole in the first and second recording layers, but into the one portion of the buffer area. Thus, it is possible to greatly reduce a time required for the layer jump as a whole.

Incidentally, in response to the various aspects of the embodiment of the information recording apparatus of the present invention, the embodiment of the information recording method of the present invention can also adopt various aspects.

Embodiment of Information Recording/Reproducing Method

Hereinafter, the information recording/reproducing method in an embodiment of the present invention will be discussed.

The embodiment of the information recording method of the present invention is an information recording/reproducing method in an information recording/reproducing apparatus, provided with: the embodiment of the information recording apparatus of the present invention (including its various aspects), and further provided with: reading device capable of reading the first and second portions from the first and second recording layers; and a reproducing device for reproducing the read first and second portions, the information recording/reproducing method provided with: a controlling process of controlling the reading device (I) to read the first portion from the first recording layer along the first track path, and then read the predetermined amount of first buffer data in the one portion of the buffer area of the first recording layer, and then (II) to search for any one of addresses out of the correspondence address, the quasi-correspondence address, and the firstly recognized address, while reading the predetermined amount of second buffer data in the one portion of the buffer area of the second recording layer, and then start reading of the second portion along the second track path on the basis of the searched address.

According to the embodiment of the information recording/reproducing method of the present invention, as in the case of the above-mentioned embodiment of the information recording/reproducing apparatus of the present invention, a link is not generated for the first and second portions which are actual data, but is generated for the first and second buffer data written in the one portion of the first and second buffer areas. Thus, it is possible to almost or completely prevent the deterioration of signal quality caused by the layer jump of the first and second portions which are actual data, at the time of the reproduction operation by the reproducing device, under the control of the controlling device. In addition, upon the layer jump, it is possible to perform a fast, accurate, and efficient reproduction operation.

Embodiment of Computer Program

Hereinafter, the computer program in an embodiment of the present invention will be discussed.

The embodiment of the computer program of the present invention is a computer program of instructions for recording control and for tangibly embodying a program of instructions executable by a computer provided in the above-mentioned embodiment of the information recording apparatus of the present invention (including its various aspects), to make the computer function as at least one portion of the controlling device and the writing device.

According to the embodiment of the computer program of the present invention, the above-mentioned embodiment of the information recording apparatus of the present invention can be relatively easily realized as a computer reads and executes the computer program from a program storage device, such as a ROM, a CD-ROM, a DVD-ROM, and a hard disk.

Incidentally, in response to the various aspects of the embodiment of the information recording apparatus of the present invention described above, the embodiment of the computer program of the present invention can also adopt various aspects.

An embodiment of a computer program product in a computer-readable medium of the present invention tangibly embodies a program of instructions executable by a computer provided for the above-mentioned recording apparatus of the present invention (including its various aspects), the program making the computer function as at least one portion of the writing device, and the controlling device.

According to the computer program product of the present invention, at least one portion of the writing device, and the controlling device of the present invention mentioned above may be embodied relatively easily, by reading and running the computer program product from a record medium, such as a ROM, a CD-ROM, a DVD-ROM, a hard disk and so on, which stores the computer program thereon. More specifically, the computer program product may be made of computer readable codes (or computer readable commands) to make the computer function as at least one portion of the writing device, and the controlling device.

These effects and other advantages of the present invention become more apparent from the following examples.

As explained above, according to the embodiment of the information recording apparatus of the present invention is provided with: the writing device; and the controlling device, and according to the embodiment of the information recording method of the present invention is provided with: the writing device; and the controlling process. Thus, it is possible to almost or completely prevent the deterioration of signal quality caused by the layer jump of the first and second portions which are actual data, at the time of the recording operation. According to the embodiment of the information recording/reproducing apparatus of the present invention is provided with: the writing device; the controlling device; the reading device; and the reproducing device, and according to the embodiment of the information recording/reproducing method of the present invention is provided with: the writing device; the controlling process; the reading device; and the reproducing device. Thus, it is possible to almost or completely prevent the deterioration of signal quality caused by the layer jump of the first and second portions which are actual data, at the time of the recording or reproduction operation. Moreover, according to the embodiment of the computer program of the present invention, it makes a computer function as the above-mentioned embodiment of the information recording apparatus of the present invention. Thus, it is possible to almost or completely prevent the deterioration of signal quality caused by the layer jump of the first and second portions which are actual data, at the time of the recording operation.

EXAMPLES

First Example of Information Recording Apparatus (Information Recording Medium)

Next, with reference to FIG. 1 to FIG. 8, a detailed explanation will be given for the structure and the operation of a first example of the information recording apparatus of the present invention, and an information recording medium which is a recording target of the information recording apparatus of the present invention.

At first, with reference to FIG. 1, the basic structure of an optical disc associated with the information recording medium which is a recording target of the first example of the information recording medium of the present invention will be discussed. FIG. 1(a) is a substantial plan view showing the basic structure of an optical disc having a plurality of recording areas in the first example of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101; a data area 102; and a lead-out area 103 or a middle area 104, associated with the example, centered on a center hole 1. Then, for example, on a transparent substrate 106 of the optical disc 100, there are laminated recording layers and the like. In each recording area of the recording layers, a track or tracks 10, such as a groove track and a land track, are alternately placed, spirally or concentrically, with the center hole 1 as the center. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

Particularly, the optical disc 100 in the example, as shown in FIG. 1(b), has such a structure that an L0 layer which constitute one example of the "first recording layer" of the present invention and an L1 layer which constitute one example of the "second record layers" of the present invention are laminated on the transparent substrate 106, for example. Upon the recording/reproduction of such a two-layer type optical disc 100, the recording/reproduction in the L0 layer or the L1 layer is performed, depending on which recording layer has the focus position of laser light LB, irradiated from the upper to the lower side in FIG. 1(b). Moreover, the optical disc 100 in the example is not limited to a two-layer single sided type, i.e., a dual layer type, but may be a two-layer double sided type, i.e., a dual layer double sided type. Furthermore, the optical disc 100 in the example is not limited to the optical disc having the two recording layers, as described above, but may be an optical disc of a multilayer type which has three or more layers.

Incidentally, a recording/reproducing procedure by the opposite method on the two-layer type optical disc and the data structure of each layer will be described later. Moreover, for convenience of explanation, in FIG. 1(b), the laser light LB is irradiated from the upper to the lower side in the drawing, as opposed to FIG. 3 or the like described later.

(Information Recording Apparatus)

Next, with reference to FIG. 2, the structure of an information recording/reproducing apparatus 300 in the first example of the information recording medium of the present invention will be discussed. FIG. 2 is a block diagram showing the information recording/reproducing apparatus in the first example of the information recording apparatus of the present invention. Incidentally, the information recording/reproducing apparatus 300 has a function of recording the record data onto the optical disc 100 and a function of reproducing the record data recorded on the optical disc 100.

With reference to FIG. 2, the inner structure of the information recording/reproducing apparatus 300 will be explained. The information recording/reproducing apparatus 300 is an apparatus for recording information onto the optical disc 100 and reading the information recorded on the optical disc 100, under the control of a CPU (Central Processing Unit).

The information recording/reproducing apparatus 300 is provided with: the optical disc 100; a spindle motor 351; an optical pickup 352; a signal recording/reproducing device 353; a CPU (drive control device) 354; a memory 355; a data input/output control device 306; an operation control device 307; an operation button 310; a display panel 311; and a bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser located in the optical pickup 352, in order to determine an optimum laser power by the recording and reproduction processes for the OPC pattern, together with a not-illustrated timing generator or the like, under the CPU 354, upon the OPC (Optimum Power Calibration) process. In particular, the signal recording/reproducing device 353 constitutes one example of the "writing device", the "reading device", and the "reproducing device" of the present invention, together with the optical pickup 352.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer used for compression/decompression of video data; a RAM area into which a parameter required for the operation of a program or the like is stored; and the like.

The CPU (drive control device) 354 is connected to the signal recording/reproducing device 353 and the memory 355 through the bus 357, and controls the entire information recording/reproducing apparatus 300 by giving an instruction to each controlling device. In general, software or firmware for operating the CPU 354 is stored in the memory 355. In particular, the CPU 354 is one specific example of the "controlling device" of the present invention.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior in a MPEG format, for example, and outputs it to the memory 355, upon data inputting. Upon data outputting, it decompresses (decodes) the encoded data in the MPEG format or the like received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354, and outputs the operation state of the information recording/reproducing apparatus 300, such as during recording and during reproduction, to the display panel 311, such as a fluorescent tube. In particular, in the embodiment, the operation control device 307 may be provided with a not-illustrated CPU and memory or the like, as the host computer of the present invention.

One specific example of the information recording/reproducing apparatus 300, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

Next, with reference to FIG. 3, an explanation will be given for the data structure of the two-layer type optical disc associated with the information recording medium which is a recording target of the first example of the information recording apparatus of the present invention, a physical sector number of a sector constituting an ECC block in the recording area of the optical disc, and a recording or reproducing procedure in the opposite method of the optical disc. The physical sector number (hereinafter referred to as a "sector number") herein is position information which indicates an absolute physical address in the recording area of the optical disc. Moreover, FIG. 3 is a conceptual graph showing the data structure of the two-layer type optical disc associated with the information recording medium which is a recording target of the first example of the information recording apparatus of the present invention, the physical sector number of a sector constituting an ECC block in the recording area of the optical disc, and the recording or reproducing method by an opposite method of the optical disc. The vertical axis indicates the sector number expressed by a hexadecimal number, and the horizontal axis indicates a relative position in the radial direction of the optical disc.

As shown in FIG. 3, the two-layer type optical disc 100 which is the recording target of the first example of the information recording apparatus of the present invention is provided with: the above-mentioned transparent substrate; and the two recording layers stacked or laminated on the transparent substrate, i.e. the L0 layer and the L1 layer.

Specifically, the L0 layer is provided with: a lead-in area 101-0; a data area 102-0; and a middle area 104-0, from the inner to the outer circumferential side. The lead-in area 101-0 id provided with: a PC (Power Calibration) area PCA for an OPC (Optimum Power Calibration) process, an RM (Recording Management) area RMA in which recording management information is recorded, and the like.

On the other hand, the L1 layer is provided with: a middle area 104-1; a data area 102-1; and a lead-out area 103-1, from the outer to the inner circumferential side. A not-illustrated OPC area or the like may be also located in the lead-out area 103-1.

Since the two-layer type optical disc is constructed in the above manner, upon the recording or reproduction of the optical disc 100, the laser light LB is irradiated from a not-illustrated substrate's side, i.e., from the lower to the upper side in FIG. 3, by a not-illustrated optical pickup of the information recording/reproducing apparatus in the first example of the information recording apparatus of the present invention, and the focal distance thereof or the like is controlled as well as the travel distance and direction in the radial direction of the optical disc 100. By this, the data is recorded into each recording layer, or the recorded data is reproduced.

In particular, the opposite method is adopted as the recording or reproducing procedure of the two-layer type optical disc associated with the information recording medium which is the recording target of the first example of the information recording apparatus of the present invention. More specifically, the opposite method herein is such a method that the optical pickup of the information recording/reproducing apparatus in the first example is displaced from the inner to the outer circumferential side, i.e. in a direction of a right-pointing arrow in FIG. 3, in the L0 layer as the recording or reproducing procedure of the two-layer type optical disc, while the optical pickup is displaced from the outer to the inner circumferential side, i.e. in a direction of a left-pointing arrow in FIG. 3, in the L1 layer, to thereby perform the recording or reproduction on the two-layer type optical disc. In the opposite method, if the recording or reproduction is ended in the L0 layer, the optical pickup, located on the most outer circumference, does not need to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel manner. This is why the opposite method is adopted in the recording of large volumes of content information, such as video data.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 3), the start position of the data area 102-0 with a sector number of "030000h" (refer to a B point in FIG. 3), and the end position of the data area 102-0 with a sector number of "1AFFFFh" (hereinafter referred to as a "turn-around point" in the L0 layer, as occasion demands: refer to a C point in FIG. 3), and the optical pickup is displaced to the middle area 104-0 which functions as the buffer, by which the recording or reproduction is performed in the L0 layer. Incidentally, in the example, "h" at the tail of "30000h" or the like indicates that it is expressed by the hexadecimal number. On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 3), and the end position of the data area 102-1 with a sector number of "FCFFEFh" (refer to an E point in FIG. 3), and the optical pickup is displaced to the lead-out area 103-1, by which the recording or reproduction is performed in the L1 layer.

All the sector numbers in the L0 layer and the L1 layer explained above have a 15's complement number relationship in the hexadecimal number. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal number to a binary number of "0001101011111111111111111", inverting the bits to "1110010100000000000000000", and reconverting it to the "E50000h" in the hexadecimal number.

Thus, the content information is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

With respect to the physical sector number explained above, a Logical Block Address (LBA) is assigned, one to one. More specifically, for example, a "000000" LBA corresponds to the sector number of "030000h", and a "30FFEF" LBA corresponds to the sector number of "FCFFEFh".

Next, with reference to FIG. 4, an explanation will be given for an outline of the operation of the information recording/reproducing apparatus in the first example of the information recording apparatus of the present invention. FIG. 4 is a schematic conceptual view showing the outline of the operation of the information recording/reproducing apparatus in the first example of the information recording apparatus of the present invention.

As shown in FIG. 4, the data, such as contents, is recorded into the data area 102-0 in the L0 layer. Then, continuously, a predetermined amount of buffer data, which constitutes one example of the first buffer data of the present invention, is recorded into the L0 layer as a first middle area 104a-0. Then, after layer jump to the L1 layer, a predetermined amount of buffer data, which constitutes one example of the second buffer data of the present invention, is recorded into the L1 layer as a second middle area 104a-1. Then, continuously, the data is recorded into the data area 102-1 (step S1). Then, at the time of a finalize process, for example, buffer data is written once into the L0 layer to form the middle area 104-0 as a whole (step S2), and also written once into the L1 layer to form the middle area 104-1 as a whole (step S3).

Next, with reference to FIG. 5, an explanation will be given for the principle of an operation in which buffer data is written into the middle area of the optical disc and layer jump is performed by the information recording/reproducing apparatus in the first example of the information recording apparatus of the present invention. FIG. 5 are a schematic conceptual view showing the principle of the operation in which buffer data is written into the middle area of the optical disc and the layer jump is performed by the information recording/reproducing apparatus in the first example of the information recording apparatus of the present invention (FIG. 5(*a*)), and a schematic graph showing transition of the sector number upon the layer jump (FIG. 5(*b*)). The vertical axis indicates a physical address number, and the horizontal axis indicates a relative position relationship on the inner and outer circumferential sides of the optical disc.

As shown in FIG. 5(*a*), after the normal recording of the data, such as contents, a predetermined amount of buffer data with "n" ECC blocks, for example, which constitutes one example of the first buffer data of the present invention, is recorded into the middle area 104-0 of the L0 layer. Then, after layer jump to the L1 layer, a predetermined amount of buffer data, which constitutes one example of the second buffer data of the present invention, is recorded into the middle area 104-1 of the L1 layer.

Hereinafter, this is explained more specifically. Each ECC block is provided with "16" sectors ("32"KB). The sector located at the head of each ECC block can function or be as a linking sector which links the sectors.

As shown in the L0 layer in FIG. 5(*a*) and in the line on the lower side of FIG. 5(*b*), the sector numbers ("X1" to "Xn") of the linking sectors of the "1"st to the "n"th ECC blocks are shown in the L0 layer. Incidentally, it can be also said that the sector number of the above-mentioned first middle area is expressed by "X1" to "Xn".

On the other hand, as shown in the L1 layer in FIG. 5(*a*) and in the line on the upper side of FIG. 5(*b*), the sector numbers ("InvXn" (Invert Xn) to "InvX1") of the linking sectors in the L1 layer are shown, correspondingly to the sector numbers ("Xn" to "X1") of the linking sectors of the "n"th to the "1"st ECC blocks in the L0 layer. Incidentally, it can be also said that the sector number of the above-mentioned second middle area is expressed by "InvXn" to "InvX1+15".

By virtue of the above-mentioned construction, at the time of additional recording, the buffer data is recorded from the linking sector (sector number: X1) of the "1"st ECC block to the linking sector (sector number: Xn) of the "n"th ECC block in the L0 layer. Then, the layer jump from the L0 layer to the L1 layer is performed, and also the linking sector (sector number: InvXn) is searched for in the L1 layer. Then, the link (linking) is performed in a linking position between the linking sector (sector number: Xn) and the searched linking sector (sector number: InvXn). Incidentally, the details of the link structure in the linking position in the sector will be explained in FIG. 6 and FIG. 7 descried later. Then, in the L1 layer, the buffer data is recorded from the linking sector (sector number: InvXn) to an ECC block including the linking sector (sector number: InvX1), i.e., to a sector (sector number: InvX1+15).

Next, with reference to FIG. 6, an explanation will be given for the details of one specific example of the structure of the link along a track path in the linking position in the sector by the information recording/reproducing apparatus in the first example of the information recording apparatus of the present invention. FIG. 6 are a schematic structure diagram showing one specific example of the structure of a link along the track path in the linking position in the sector by the information recording/reproducing apparatus in the first example of the information recording apparatus of the present invention (FIG. 6(*a*)), and a schematic conceptual view showing a position where the link is performed (FIG. 6(*b*)).

As shown in FIG. 6(*a*), if additional recording (refer to step S102) is newly performed behind a recorded area (refer to step S101), the link (overwriting) is performed in the linking position in the sector. More specifically, it is mostly an unrecorded area, and information is already recorded up to a "16"th byte in a first sync frame out of 26 sync frames in the linking sector located at the head of 1 ECC block (16 sectors) where the additional recording is newly performed. Now, if additional recording is newly performed, the additional recording is started from between a "15"th byte and a "17"th byte in the first sync frame of this linking sector, for example, from the "16"th byte.

As described above, the 16th byte in the first sync frame of the linking sector located at the head of 1 ECC block is an area overwritten by the additional recording newly performed, and is referred to as the linking position. More specifically, a linking sector with an information amount of 2 KB, for example, is provided with 26 sync frames, and each sync frame is provided with a "32" channel bit synchronization signal portion and a "1488" channel bit data portion. There are 8 types of synchronization signals, such as "SY0" and "SY5", in FIG. 6(a), and a unique pair of sync frames can be specified by combining two of the synchronization signals. Thus, the information recording/reproducing apparatus can control in which position the recording is performed in 1 sector.

The link along the track path in the above manner is performed when the additional recording is performed upon the layer jump from the L0 layer to the L1 layer, as shown in FIG. 6(b) (refer to a link portion R1). Moreover, it is also performed when the buffer data is written once along the track path next to the first middle area 104a-0 in the L0 layer (refer to a link portion R2).

Incidentally, according to the researchers of the present invention, the additional recording by a unit of mark pit can be realized, but it is preferably not performed. This is because it is better to consider uncertainty of a mark pit shape due to heat conduction in the beginning and in the end of the recording, and a certain degree of margin for the information recording apparatus. Moreover, a shift or deviation in the area to be overwritten or a writing error, caused by a discrepancy in a recording clock unit, is error-corrected by an ECC (Error Correcting Code). Moreover, the additional recording is preferably not performed in the channel bit synchronization signal portion (or the portion of the synchronization signal of the channel bit), nor in the data portion located just before the synchronization signal portion. This is because if the above-mentioned various margins are considered, the writing error likely occurs, and even in that case, the error correction is performed by the ECC in the same manner. In particular, the synchronization signal portion is closely related to a control operation, so that the link in the synchronization signal portion is not performed on a DVD, according to the standard.

Next, with reference to FIG. 7, an explanation will be given for the details of one specific example of the structure of a link in a direction opposite to the track path in the linking position in the sector by the information recording/reproducing apparatus in the first example of the information recording apparatus of the present invention. Here, FIG. 7 are a schematic structure diagram showing one specific example of the structure of a link in the direction opposite to the track path in the linking position in the sector by the information recording/reproducing apparatus in the first example of the information recording apparatus of the present invention (FIG. 7(a)), and a schematic conceptual view showing a position where the link is performed (FIG. 7(b)).

As shown in FIG. 7(a), if additional recording (refer to step S202) is newly performed on the side of the head of a recorded area (refer to step S201), the link (overwriting) is performed in the linking position in the sector. More specifically, it is mostly a recorded area, and information is already recorded after between a "15"th byte and a "17"th byte, for example, a "16"th byte, in a first sync frame out of 26 sync frames in the linking sector located at the head of 1 ECC block (16 sectors) where the additional recording is newly performed. Now, if additional recording is newly performed, the additional recording is performed up to the "16"th byte in the first sync frame of this linking sector, for example As described above, as in the above-mentioned FIG. 6, the 16th byte in the first sync frame of the linking sector located at the head of 1 ECC block is an area overwritten by the additional recording newly performed, and is referred to as the linking position.

The link in the direction opposite to the track path is performed when the buffer data is written once in order in the direction opposite to the track path after the recording of the second middle area 104a-1 in the L1 layer, as shown in FIG. 7(b) (refer to a link portion R3).

Next, with reference to FIG. 8, a study is made on the operation and the effect of the information recording/reproducing apparatus in the first example of the information recording apparatus of the present invention. FIG. 8 are a schematic conceptual view showing an outline of the operation of an information recording/reproducing apparatus in one specific example of a comparison example (FIG. 8(a)), and a schematic conceptual view showing an outline of the operation of an information recording/reproducing apparatus in another specific example of a comparison example (FIG. 8(b)).

As shown in FIG. 8(a), the data, such as contents, is recorded into the data area 102-0 in the L0 layer. Then, after layer jump to the L1 layer, the data is recorded into the data area 102-1 (step S10). Then, at the time of the finalize process, for example, the buffer data is written once into the middle area 104-0 as a whole in the L0 layer (step S20), and also written once into the middle area 104-1 as a whole in the L1 layer (step S30). In one specific example of the comparison example, the link along the track path, explained in FIG. 6, is generated for the actual data, such as contents, in a link portion 21, which causes deterioration of signal quality of the linked actual data. On the other hand, the link in a direction opposite to the track path, explained in FIG. 7, is generated for the actual data, such as contents, in a link portion 31, which causes deterioration of signal quality of the linked actual data.

In contrast, in the information recording/reproducing apparatus in the first example of the information recording apparatus of the present invention, the link is not generated for the actual data, and the link is generated for the buffer data recorded in the above-mentioned first middle areas 104a-0 and 104a-1. Thus, it is possible to almost or completely prevent the deterioration of signal quality of the actual data caused in the layer jump.

As shown in FIG. 8(b), the data, such as contents, is recorded into the data area 102-0 in the L0 layer, and also the buffer data is recorded into the middle area 104-0 as a whole in the L0 layer. Then, after layer jump to the L1 layer, the buffer data is recorded into the middle area 104-1 in the L1 layer as a whole, and also the data is recorded into the data area 102-1 (step S11). In another specific example of the comparison example, the link is not generated for the actual data. However, the buffer data is recorded into the middle area as a whole upon the layer jump, which causes a longer time required for the layer jump as a whole.

In contrast, in the information recording/reproducing apparatus in the first example of the information recording apparatus of the present invention, the predetermined amount of buffer data is recorded into the middle area, not as a whole but partially, upon the layer jump. Thus, it is possible to greatly reduce a time required for the layer jump as a whole.

Second Example of Information Recording Apparatus

Next, with reference to FIG. 9, an explanation will be given for the principle of an operation in which buffer data is written into the middle area of the optical disc and layer jump is performed by an information recording/reproducing apparatus in a second example of the information recording apparatus of the present invention. FIG. 9 are a schematic conceptual view showing the principle of the operation in which buffer data is written into a middle area of the optical disc and the layer jump is performed by the information recording/reproducing apparatus in the second example of the information recording apparatus of the present invention (FIG. 9(*a*)), and a schematic graph showing transition of the sector number upon the layer jump (FIG. 9(*b*)). Incidentally, the vertical axis and the horizontal axis are the same as those in the above-mentioned FIG. 5(*b*).

As shown in FIG. 9(*a*), the basic procedure of the additional recording of the predetermined amount of buffer data, which constitutes one example of the first and second buffer data of the present invention, and the structure, such as the sector number, of the linking sector are substantially the same as those in the first example explained with reference to FIG. 1 to FIG. 8.

Particularly in the second example, the buffer data is recorded from the linking sector (sector number: X1) of the "1"st ECC block to the linking sector (sector number: Xn) of the "n"th ECC block in the L0 layer. Then, the layer jump from the L0 layer to the L1 layer is performed, and also the linking sector (sector number: InvXn+16) is searched for in the L1 layer. The purpose is to search for the linking sector located by "1" ECC block on the inner circumferential side. Then, linking is performed in a linking position between the linking sector (sector number: Xn) and the searched linking sector (sector number: InvXn+16). Incidentally, the details of the link structure in the linking position in the sector are the same as those explained in FIG. 6 and the like descried above. Then, in the L1 layer, the buffer data is recorded from the linking sector (sector number: InvXn+16) to an ECC block including the linking sector (sector number: InvX1).

As described above, the writing of the buffer data in the L1 layer is started from the linking sector (sector number: InvXn+16), which constitutes one example of the quasi-correspondence address of the present invention, located by "1" ECC block (16 sectors) on the inner circumferential side of the searched correspondence address. Thus based on the "1" ECC block, it is possible to perform a more smooth and efficient recording operation.

Third Example of Information Recording Apparatus

Next, with reference to FIG. 10, an explanation will be given for the principle of an operation in which buffer data is written into the middle area of the optical disc and layer jump is performed by an information recording/reproducing apparatus in a third example of the information recording apparatus of the present invention. FIG. 10 are a schematic conceptual view showing the principle of the operation in which buffer data is written into a middle area of the optical disc and the layer jump is performed by the information recording/reproducing apparatus in the third example of the information recording apparatus of the present invention (FIG. 10(*a*)), and a schematic graph showing transition of the sector number upon the layer jump (FIG. 10(*b*)). Incidentally, the vertical axis and the horizontal axis are the same as those in the above-mentioned FIG. 5(*b*).

As shown in FIG. 10(*a*), the basic procedure of the additional recording of the predetermined amount of buffer data, which constitutes one example of the first and second buffer data of the present invention, and the structure, such as the sector number, of the linking sector are substantially the same as those in the first example explained with reference to FIG. 1 to FIG. 8.

Particularly in the third example, the buffer data is recorded from the linking sector (sector number: X1) of the "1"st ECC block to the linking sector (sector number: Xn) of the "n"th ECC block in the L0 layer. Then, the layer jump from the L0 layer to the L1 layer is performed. Also, in the L1 layer, a sector number "InvXw" of a linking sector where the linking position is detected for the first time may be recorded into an area where management or control information is recorded, such as a RM (Recording Management) area of the optical disc, or into the middle area just before (or just inner side of the data area of the L1 layer. Incidentally, the linking sector may be located by about several tens track pitch on the inner or outer circumferential side. Then, linking is performed in a linking position between the linking sector (sector number: Xn) and the stored linking sector (sector number: InvXw). Incidentally, the details of the link structure in the linking position in the sector are the same as those explained in FIG. 6 and the like descried above. Then, in the L1 layer, the buffer data is recorded from the linking sector (sector number: InvXw) to an ECC block including the linking sector (sector number: InvX1).

As described above, the writing of the buffer data in the L1 layer is started from the linking sector (sector number: InvXw) which constitutes one example of the "firstly recognized address" of the present invention. Thus, the search operation is unnecessary, so that it is possible to perform a more fast and efficient recording operation.

Incidentally, the first to third examples show specific examples in which the ECC block and the area where the additional recording is performed are shifted to some degree from a boundary of the ECC blocks according to the standard of the DVD; however, the boundary of the ECC blocks may match the area where the additional recording is performed.

In the examples, as one specific example of the information recording apparatus, an information recording/reproducing apparatus for a write-once type optical disc, such as a two-layer type DVD-R, is explained, for example. The present invention, however, can be applied to an information recording/reproducing apparatus for a rewritable type optical disc, such as a two-layer type DVD-R/W, for example. In addition, it can be also applied to an information recording/reproducing apparatus for a multiple layer type optical disc, such as a three-layer type, for example. Moreover, it can be also applied to an information recording/reproducing apparatus for other large-volume recording media of a multilayer type.

The present invention is not limited to the above-described examples, and various changes may be made, if desired, without departing from the essence or spirit of the invention which can be read from the claims and the entire specification. An information recording apparatus, an information recording method, and a computer program which involve such changes, are also intended to be within the technical scope of the present invention.

INDUSTRIAL APPLICABILITY

The information recording apparatus and method, and the computer program according to the present invention can be applied to a recorder or the like, associated with a multilayer type optical disc on which various information can be recorded with high density, for consumer or industrial use, for example. Moreover, they can be applied to a recording apparatus or the like, which is mounted on or can be connected to various computer equipment for consumer or industrial use, for example.

The invention claimed is:

1. An information recording apparatus comprising:
a writing device configured to i) write, with respect to a disc-shaped information recording medium, in which at least first and second recording layers, making a pair, are laminated, and in which a buffer area, to prevent a recording or reproduction position for the first and second recording layers from being off to an unrecorded area, is disposed in a position adjacent to a recording area in the first and second recording layers, a first portion out of information to be recorded into the first recording layer along a first track path directing from a first side to a second side out of an inner circumferential side and an outer circumferential side of the information recording medium, and ii) write a second portion out of the information to be recorded into the second recording layer, with a recording direction reversed, along a second track path directing from the second side to the first side; and
a controlling device configured to control said writing device i) to write the first portion into the first recording layer along the first track path, and then write a predetermined amount of first buffer data into the first recording layer along the first track path in one portion of the buffer area of the first recording layer, and also to perform layer jump from the first recording layer to the second recording layer, and then ii) to write a predetermined amount of second buffer data into the second recording layer along the second track path in one portion of the buffer area of the second recording layer, and then write the second portion into the second recording layer along the second track path.

2. The information recording apparatus according to claim 1, wherein said controlling device is further configured to control said writing device to end writing of the predetermined amount of first buffer data into the first recording layer, in a predetermined recording unit including a physical address, in the one portion of the buffer area of the first recording layer.

3. The information recording apparatus according to claim 2, wherein said controlling device is further configured to control said writing device to start writing of the predetermined amount of second buffer data into the second recording layer, from the predetermined recording unit including a correspondence address in the one portion of the buffer area of the second recording layer corresponding to the physical address.

4. The information recording apparatus according to claim 3, wherein said controlling device is further configured to control said writing device to search for the correspondence address after the writing of the predetermined amount of first buffer data into the first recording layer, and to write the predetermined amount of second buffer data on the basis of the searched correspondence address.

5. The information recording apparatus according to claim 2, wherein said controlling device is further configured to control said writing device to start writing of the predetermined amount of second buffer data into the second recording layer, from the predetermined recording unit including a quasi-correspondence address located on the first side of a correspondence address in the one portion of the buffer area of the second recording layer corresponding to the physical address.

6. The information recording apparatus according to claim 5, wherein said controlling device is further configured to control said writing device to search for the quasi-correspondence address after the writing of the predetermined amount of first buffer data into the first recording layer, and to write the predetermined amount of second buffer data based upon the searched quasi-correspondence address.

7. The information recording apparatus according to claim 2, wherein said controlling device is further configured to control said writing device to start writing of the predetermined amount of second buffer data into the second recording layer, from the predetermined recording unit including a firstly recognized address.

8. The information recording apparatus according to claim 7, wherein said controlling device is further configured to control said writing device to write the firstly recognized address into a predetermined area in at least one of the first and second recording layers.

9. The information recording apparatus according to claim 7, wherein said controlling device is further configured to control said writing device to write a last address where recording is ended in the one portion of the buffer area of the first recording layer, into a predetermined area in at least one of the first and second recording layers.

10. The information recording apparatus according to claim 1, wherein said controlling device is further configured to control said writing device to further write the first buffer data in order to fill up another portion of the first buffer area and to further write the second buffer data in order to fill up another portion of the second buffer area, after writing of the second portion into the second recording layer is completed.

11. The information recording apparatus according to claim 1, wherein said controlling device is further configured to control said writing device to start recording of the first portion from a portion of the first recording layer continued from a lead-in area of the information recording medium, and to write information for forming a lead-out area on the first side of a recording end position of the second recording layer, after writing of the second portion into the second recording layer is completed.

12. The information recording apparatus according to claim 1, wherein,
said writing device is configured to optically write the first and second portions by irradiating laser light,
the second recording layer is located on a rear side of the first recording layer as viewed from an irradiation direction of the laser light, and
said controlling device is configured to control said writing device to perform layer focus jump from the first recording layer to the second recording layer, as the layer jump.

13. An information recording/reproducing apparatus, comprising:
a writing device i) configured to write, with respect to a disc-shaped information recording medium in which at least first and second recording layers forming a pair are laminated and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and ii) configured to write a second portion out of the information to be recorded into the second recording layer, with a recording direction reversed, along a second track path directing from the other side to the one side;

a controlling device configured to control said writing device i) to write the first portion into the first recording layer along the first track path, and then to write a predetermined amount of first buffer data into the first recording layer along the first track path in one portion of the buffer area of the first recording layer, and also to perform layer jump from the first recording layer to the second recording layer, and then ii) to write a predetermined amount of second buffer data into the second recording layer alone the second track path in one portion of the buffer area of the second recording layer, and then to write the second portion into the second recording layer along the second track path;

a reading device configured to read the first and second portions from the first and second recording layers; and a reproducing device configured to reproduce the read first and second portions, wherein, said controlling device is configured to control said writing device to end writing of the predetermined amount of first buffer data into the first recording layer, in a predetermined recording unit including a physical address, in the one portion of the buffer area of the first recording layer, said controlling device is configured to control said writing device to start writing of the predetermined amount of second buffer data into the second recording layer, from a predetermined recording unit including a correspondence address in the one portion of the buffer area of the second recording layer corresponding to the physical address, and said controlling device is configured to control said reading device i) to read the first portion from the first recording layer along the first track path, and then read the predetermined amount of first buffer data in the one portion of the buffer area of the first recording layer, and then ii) to search for any one of addresses out of the correspondence address, the quasi-correspondence address, and the firstly recognized address, while reading the predetermined amount of second buffer data in the one portion of the buffer area of the second recording layer, and then start reading of the second portion along the second track path on the basis of the searched address, and controls said reproducing device to reproduce the read first and second portions.

14. An information recording method in an information recording apparatus, comprising the step of:

using a writing device i) configured to write, with respect to a disc-shaped information recording medium in which at least first and second recording layers, making a pair, are laminated, and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and ii) configured to write a second portion out of the information to be recorded into the second recording layer, with a recording direction reversed, along a second track path directing from the other side to the one side, wherein the using step comprises the sub-step of:

controlling said writing device i) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then ii) to write a predetermined amount of second buffer data into the second recording layer along the second track path in one portion of the buffer area of the second recording layer, and then write the second portion into the second recording layer along the second track path.

15. An information recording/reproducing method in an information recording/reproducing apparatus, comprising the step of:

using an apparatus comprised of, a writing device i) configured to write, with respect to a disc-shaped information recording medium, in which at least first and second recording layers, making a pair, are laminated, and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and ii) configured to write a second portion out of the information to be recorded into the second recording layer, with a recording direction reversed, along a second track path directing from the other side to the one side, a controlling device for controlling said writing device i) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then ii) to write a predetermined amount of second buffer data into the second recording layer along the second track path in one portion of the buffer area of the second recording layer and then write the second portion into the second recording layer along the second track path, a reading device configured to read the first and second portions from the first and second recording layers, and a reproducing device for reproducing the read first and second portions, wherein said controlling device controls said writing device to end writing of the predetermined amount of first buffer data into the first recording layer, in a predetermined recording unit including a physical address, in the one portion of the buffer area of the first recording layer, wherein said controlling device controls said writing device to start writing of the predetermined amount of second buffer data into the second recording layer, from a predetermined recording unit including a correspondence address in the one portion of the buffer area of the second recording layer corresponding to the physical address, and wherein said using step comprises the sub-step of:

controlling said reading device i) to read the first portion from the first recording layer along the first track path, and then read the predetermined amount of first buffer data in the one portion of the buffer area of the first recording layer, and then ii) to search for any one of addresses out of the correspondence address, the quasi-correspondence address, and the firstly recognized address, while reading the predetermined amount of second buffer data in the one portion of the buffer area of the second recording layer, and then start reading of the second portion along the second track path on the basis of the searched address.

16. A computer-readable medium storing a computer program of instructions executable by a computer, the instructions configured to cause the computer to function as at least one portion of a controlling device and a writing device, wherein the writing device is i) configured to write, with respect to a disc-shaped information recording medium in which at least first and second recording layers, making a pair, are laminated, and in which a buffer area to prevent a recording or reproduction position for the first and second recording layers from being off to an unrecorded area is disposed in a position adjacent to a recording area in the first and second recording layers, a first portion out of information to be recorded into the first recording layer along a first track path directing from one side to the other side out of an inner circumferential side and an outer circumferential side of the information recording medium, and ii) configured to write a second portion out of the information to be recorded into the second recording layer, with a recording direction reversed, along a second track path directing from the other side to the one side, and wherein the controlling device is configured to control said writing device i) to write the first portion into the first recording layer along the first track path, and then write a predetermined amount of first buffer data into the first recording layer along the first track path in one portion of the buffer area of the first recording layer, and also perform layer jump from the first recording layer to the second recording layer, and then ii) to write a predetermined amount of second buffer data into the second recording layer along the second track path in one portion of the buffer area of the second recording layer, and the write the second portion into the second recording layer along the second track path.

* * * * *